United States Patent [19]

Das

[11] Patent Number: 4,752,537
[45] Date of Patent: Jun. 21, 1988

[54] METAL MATRIX COMPOSITE FIBER REINFORCED WELD

[75] Inventor: K. Bhagwan Das, Seattle, Wash.

[73] Assignee: The Boeing Company, Seattle, Wash.

[21] Appl. No.: 854,205

[22] Filed: Apr. 21, 1986

Related U.S. Application Data

[60] Division of Ser. No. 743,175, Jun. 10, 1985, Pat. No. 4,625,095, which is a continuation-in-part of Ser. No. 473,718, Mar. 8, 1983, abandoned.

[51] Int. Cl.⁴ ............................................. B32B 5/22
[52] U.S. Cl. .................... 428/614; 428/649; 428/654
[58] Field of Search .............. 428/614, 608, 654, 649, 428/650

[56] References Cited

U.S. PATENT DOCUMENTS

| | | | |
|---|---|---|---|
| 1,441,686 | 1/1923 | Jones | 428/608 |
| 3,455,662 | 7/1969 | Alexander et al. | 428/608 |
| 3,638,734 | 2/1972 | Ault | 428/608 |
| 4,134,759 | 1/1979 | Yajima et al. | 428/608 |

FOREIGN PATENT DOCUMENTS

| | | | |
|---|---|---|---|
| 2010841 | 9/1971 | Fed. Rep. of Germany | 75/0.5 B |
| 2147735 | 3/1973 | Fed. Rep. of Germany | 428/608 |

OTHER PUBLICATIONS

Metals Handbook, 9th Ed., vol. 6, "Welding, Brazing & Soldering", American Society for Metals, 1983, pp. 7, 19, 20.

Primary Examiner—John J. Zimmerman
Attorney, Agent, or Firm—John C. Hammar

[57] ABSTRACT

A welded article, comprising at least one fiber reinforced metal matrix composite joined to another article with a weld having a composition of matrix metal and between about 12–20 volume percent reinforcing fibers to strengthen the weld over that of unreinforced matrix metal welds.

8 Claims, 1 Drawing Sheet

METAL MATRIX COMPOSITE FIBER REINFORCED WELD

CROSS-REFERENCE TO RELATED APPLICATION

This application is a divisional application of U.S. Ser. No. 743,175, filed June 10, 1985, now U.S. Pat. No. 4,625,095 which is a continuation-in-part of U.S. Ser. No. 473,718, filed Mar. 8, 1983, now abandoned.

TECHNICAL FIELD

The present invention relates to a fiber reinforced weld in a metal matrix composite, and, more particularly, to a metal matrix composite weld wherein the weld possesses physical properties enhanced by the inclusion of fibers.

BACKGROUND OF THE INVENTION

Metal matrix composites have increasingly been used as replacement materials for conventional metal alloys because they possess many significant advantages. Among the advantages are superior strength-to-density and/or modulus-to-density ratios, improved fatigue and fracture toughness properties, and higher thermal conductivity and lower thermal expansion in the fiber direction. These properties contribute to improved rigidity and dimensional stability.

Metal-matrix composites often must be fastened to other products to form end products, and their fastening to themselves or to conventional structural alloys is problematical. Mechanical fastening, diffusion bonding, laser welding, electron beam welding, brazing and various fusion welding techniques all present problems.

Mechanical fastening produces stress concentrations in the vicinity of fastener holes resulting in a reduction of mechanical properties. In addition, such joints are potentially susceptible to crevice corrosion. Although brazing is suitable for lap joints, the extended exposure to the high temperatures required for brazing may cause the matrix metal to react with the reinforcing fibers, leading to loss of filament strength. Although in fusion welding, the matrix metals usually melt without harming the fiber materials because the melting point of most matrix materials is appreciably lower than those of the fibers, fiber damage during fusion welding depends upon the reactivity of the fibers and the duration of contact between the fiber and the molten metal. In the case of boron/aluminum composites, arc welding causes severe fiber damage, poor metal flow, and lack of wetting of the fibers by the molten aluminum matrix. The addition of filler material eliminates some of these difficulties.

SUMMARY OF THE INVENTION

The present invention relates to a method for welding metal matrix composites which are used as alternatives to conventional metal alloys. This invention also relates to a method of strengthening welds by the addition of fibrous material to the weld. Novel welding rods or consumable electrodes introduce fibers to the weld pool are also disclosed.

In the present invention, metal matrix composite articles are joined in a manner such that the weld is reinforced with fibrous material. The method of the present invention abuts a plurality of articles to define a weld line. A molten pool of matrix metal is formed along one portion of the weld line, and the pool is extended along the weld line in a welding process to form a weld joint. A sufficient amount of fibrous reinforcing material is introduced to the molten pool, preferably in the portion of the pool where the metal is decreasing in temperature, to yield a strengthened weld having properties closer to those of the bodies of the metal matrix components which are joined with the weld. In one embodiment, the fibrous reinforcing material is added to the molten pool by injecting the material through a tube directed to the pool of molten metal. Another embodiment uses an adherent coating on the bodies of the joint which is applied prior to forming the molten pool. The coating comprises a mixture of at least the fibers and the matrix metal. Still another embodiment introduces the reinforcing fibers to the pool with a consumable electrode having a composition including appropriate amounts of matrix metal and reinforcing fibers.

The consumable electrode or weld rod preferably has a hollow cylindrical sheath fabricated from the matrix metal or from a compatible metal. The core is packed with a mixture of fibers and matrix metal powder in a predetermined ratio which will result in the proper concentration of reinforcing material in the weld pool when forming the joint. Generally the fibers comprise about 12-20 vol % of the core filler material so that the resulting weld pool will have sufficient fiber (around 12-20%, also) for reinforcement while not too much fiber that the viscosity and flow characteristics of the weld pool are adversely impaired.

In a preferred embodiment, the invention relates to a method for arc welding a joint for metal matrix composites or for a matrix composite and a simple alloy which includes reinforcing fiber in the weld and which does not deplete the fiber concentration in the trailing edge of the weld pool. The weld contains sufficient reinforcing fibers to impart to the weld and resulting joint mechanical properties closer to those properties possessed by the body of the composite than a weld without reinforcement. The preferred method comprises the steps of:

(a) establishing a weld pool of molten metal substantially free of reinforcing fibers;

(b) introducing a consumable electrode to the weld pool, the electrode including a core of metal powder and reinforcing fibers comparable to and compatible with the metal matrix composite composition, the fibers comprising about 12-20 vol % of the core so that the weld pool retains satisfactory flow characteristics and viscosity during welding; and (c) extending the weld pool along the weld line of the joint with an electrode while introducing reinforcing fibers to the pool.

The resulting weld and joint contains about 12-20 vol % reinforcing fibers. The electrode may be consumed in the welding operation, and may act as the means for introducing the proper amount of fibers to the weld pool.

DESCRIPTION OF THE PREFERRED EMBODIMENTS

Figure 1:
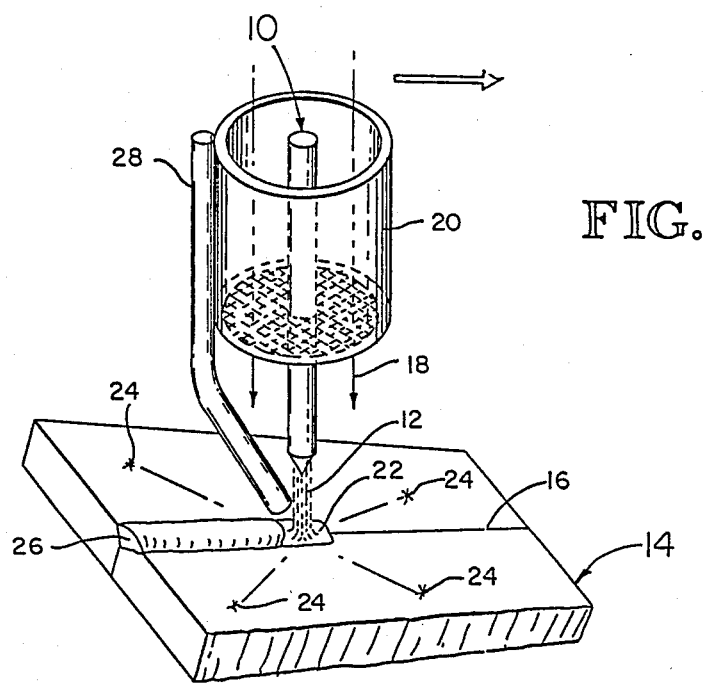
FIG. 1 is a partial cross-sectional view of a gas-shielded fusion welding apparatus illustrating one means of introducing fibrous reinforcing material to the molten pool formed on the article being joined.
Figure 3:
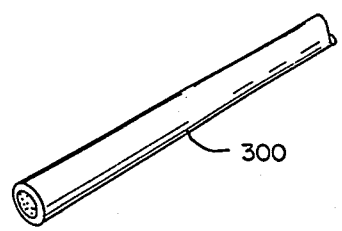
FIG. 3 is an isometric of a consumable electrode.

Metal matrix composites have fibrous reinforcing material dispersed in a metal or metal alloy matrix. The fibrous material (fibers) may be of discrete lengths, may be a continuous filament, may be randomly oriented, or may have a specific orientation to produce anisotropic properties in the composite.

For the fibers to have a good interfacial bond with the matrix metal so that the composite has enhanced properties over those of the unreinforced matrix metal, the fibers must be compatible with the matrix metal. Because metal matrix composite materials are economically formed from matrix metal at elevated temperatures, the fibers should be capable of withstanding these high temperatures and withstanding the potentially reactive conditions created upon contact of the fibers with molten matrix metal.

Developing the proper pairing and proportions of fibrous reinforcing materials and matrix metals for commercial use is complicated and involves more than selecting any matrix metal and fiber. Experimentation with respect to chemical compatibility, mechanical interaction, and fracture mechanisms must be done. Those skilled in the art have identified desired fiber-metal systems, and research continues to add to the range of metal matrix composites.

The present invention finds particular utility in metal matrix composites using lightweight metals such as aluminum or magnesium. These relatively strong, ductile, and light metals and their alloys may be joined by the welding methods of the present invention at relatively low temperatures. Titanium and iron alloys are also matrix metals, although their welding involves significantly higher temperatures, which may promote detrimental reaction between reinforcing fibers and metals. Super-alloys, such as alloys based on cobalt, nickel, columbium, or tantalum, may be used as matrix metals; however, the melting temperatures of these alloys place severe demands on fibers introduced to the molten metal.

Boron, alumina, silicon carbide, and silicon nitride fibers are often used in the metal matrix composites. Silicon nitride whiskers prepared in accordance with the teachings of U.S. Pat. No. 4,388,255 or in accordance with the method of Verzemnieks described in U.S. patent application Ser. No. 536,962 (now U.S. Pat. No. 4,579,699) may be used, and are preferred for aluminum—$Si_3N_4$ metal matrix composites since the whiskers are pure and possess desired aspect ratios (length/diameter). Graphite fibers may be used, but their reactivity with the matrix metals and degradation at high temperatures should be considered.

It may be possible to use fibrous reinforcing materials in some forms of the method of the present invention that have not previously been used in metal matrix composites, because the exposure of the fibrous reinforcing materials to high temperatures in the molten matrix metal is of short duration. The method of the present invention may eliminate the need to use special coatings on the metal matrix composites or on the fibers or the use of exotic or expensive processing steps to avoid fiber degradation.

The fiber material preferably has a diameter in the range of from 0.1 to 0.4 microns, and an aspect ratio (length/diameter) in the range of from 20:1 to 200:1.

To avoid the formation of fiber agglomerates in the weld, a volatile organic binder may be coated on the fibers. If a hydrocarbon is used for the coating, the evolution of hydrogen upon addition of the fibers to the weld pool may cause detrimental effects on certain matrix metals.

The welding method of present invention is useful for welding both randomly oriented, discontinuous fiber reinforced composites and for continuous fiber composites. The welded joint will ordinarily possess isotropic properties. If the weld is being used to join anisotropic composites, the substantially isotropic nature of the weld should be considered in evaluating the overall joint design. It is difficult to orient the fibers in the weld to produce anisotropic properties analogous to those possessed by the bodies of composites which are welded.

For a butt joint, a pool of molten matrix metal is formed on the weld line defined by the abutting composites usually by melting portions of the composites at the pool site. How this pool is formed, however, is not believed to be critical. Heating techniques having extremely localized heating, such as electron beam and laser welding, may not be suitable where fibrous reinforcing material is injected into the cooling portion of the pool, but may be acceptable when the fibrous material is introduced to the pool by coating the composites along the weld line.

Shielded or unshielded, consumable or non-consumable arc welding electrodes may be used to form the pool and to complete the weld by arcing along the weld line. A helium atmosphere for shielding is preferred at comparable gas pressures to argon because of its higher thermal conductivity.

FIG. 1 depicts an electrode 10 forming an arc 12 between two metal matrix composites 14 forming a butt joint 16. The arc 12 is shielded by inert gas 18 passing downwardly through a gas conduit 20 (which is shown in partial cross-section). The heat of the arc 12 melts the matrix metal in the composites 14 to form a molten pool 22. Some fibers 24 in the molten pool 22 are ejected by the arc during the formation of the pool, and are depicted schematically as ejected fibers 24. Without introducing additional fibers to the pool, the weld 26 will not contain a sufficient amount of reinforcing material to be strengthened, and the physical properties of the weld will be inferior to the properties of the bodies of the composites 14 or to a reinforced weld.

The molten pool 22 is extended along the weld line with the electrode. A sufficient amount of reinforcing material is added to the pool to provide fiber reinforcement to the weld. Preferably, the material is introduced into that portion of the pool where the metal is cooling and approaching solidification. Accordingly, as shown in FIG. 1, the material is injected into the pool 22 through a tube 28 directed to the trailing portion of the pool where the temperature of the molten metal is decreasing.

It may also be desirable to introduce additional matrix metal to the weld pool. If a non-consumable electrode is used, powdered metal may be introduced through the tube 28 along with the reinforcing material. The rates at which the powdered metal and reinforcing material is introduced to the molten pool are determined by the size of the molten pool, (which is a function of the size and temperature of the arc), by the rate at which the arc is advanced along the weld line, and by the desired ratio between the amount of reinforcing fibers and the matrix metal in the resulting weld.

Wetting of the fibers by the molten matrix metal can have a significant effect on the resulting composite, effecting particularly the load bearing properties and characteristics of the welded composites. To induce or retard wetting of the fibers, additives can be used, as will be understood to those skilled in the art.

A consumable electrode may be used, comprising (1) matrix metal, (2) a compatible metal, or (3) a mixture of matrix metal and reinforcing material. The injection tube 28 may not be necessary when a consumable electrode is used, but it still may be used to supplement the addition of materials to the molten pool over that supplied with the electrode.

Figure 4:
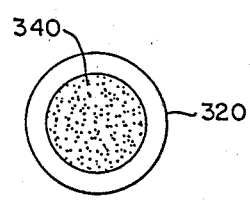
FIG. 4 is a schematic cross-sectional view of a consumable electrode used in the method of the present invention.

A preferred consumable electrode 300 comprises an outer sheath of a thin gauge tubing 320 (FIG. 4) of the matrix metal and a filled core 340 of a mixture of powdered matrix metal and chopped fiber or chopped fibers alone. Because high fiber volume fractions in the weld pool tend to increase the viscosity of the pool to a point where the flow characteristics are harmed and the weld is adversely effected, the ratio of matrix metal to fiber must be controlled.

Consumable weld rods of this type can be formed in one of at least three ways. First, a proper mixture of fiber and metal powder can be prepared and can be rolled into a metal strip in a process similar to making a jelly roll or a filled pastry. Second, the mixture can be added to a pre-fabricated tube and tamped in place to form the core. Care should be taken with these methods to avoid "fiber clumping" or localized concentrations of fibers. Third, a sheet of metal matrix composite can be pressed or cast, the composite can be cut to size, and encased in the metal tubing. In all cases, the resulting sheath and core can be processed by swaging or rolling to produce an electrode of the desired size and shape. The third method provides the best assurance against "fiber clumping", and allows better control of the addition of the proper amount of fiber to the weld pool.

A hollow non-consumable electrode may be used, and the reinforcing material and/or matrix metal may be introduced to the pool through the electrode.

Figure 2:
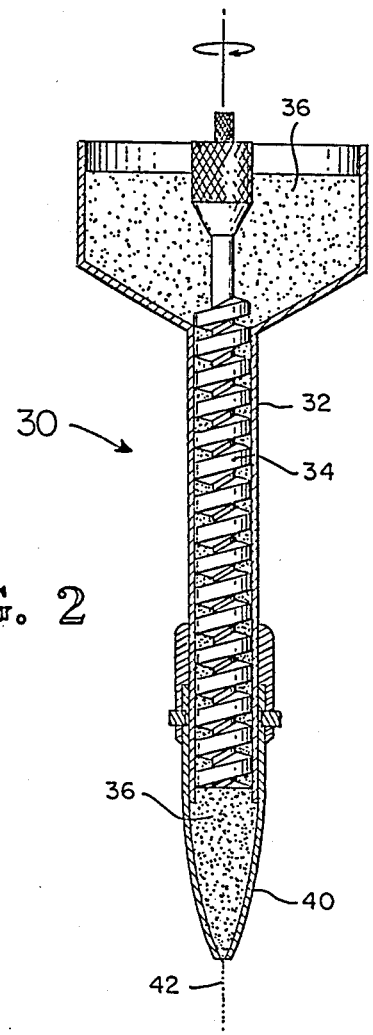
FIG. 2 is a cross-sectional view of an apparatus used to transport and introduce fibrous reinforcing material to the molten pool during a welding process.

FIG. 2 depicts a material injection device 30 particularly useful in practicing the present invention. An injector case 32 holds an auger 34 to move the reinforcing material 36 into a heat resistant nozzle 40 (which is preferably a ceramic material) where the material 36 falls in a stream 42 into the pool.

Another embodiment of the present invention involves introducing fibrous reinforcing material to the molten pool by coating the composites along the weld line prior to forming the molten pool. The coating usually includes a mixture of reinforcing material, powdered matrix metal, and an adhesive.

Because the temperature and force of the arc can destroy some of the fibers, the amount of fiber introduced to the molten pool may be calculated to reflect such losses and still result in sufficient fiber in the pool such that the weld is sufficiently reinforced.

We conducted several tests with aluminum sheet of several different thicknesses (ranging from 0.03 to 0.25 inches) coated with silicon nitride fibers along the weld line and welded with a 4043 aluminum consumable welding rod. Several cements were used with the fibers to form the coatings. Ratios of cement to fiber of about 80%, 70%, 60% and 50% by volume were used. Some coatings used water as the carrier for the fibers. Particular success was achieved using a proprietary cement known as "Cement #1," a product of Amdry Metal Products of Burbank, Ca.. A paste of Thiemflux (a product of the Thiem Corp. of Oak Creek, Wi.) and ethyl alcohol was also successful. The welding voltage was in the range of from 16 to 100 volts, and the current was in the range of from 16 to 250 amps. The welding speed was adjusted depending on the thickness of the sheet to produce a well formed weld bead containing dispersed silicon nitride fibers. While some welds had porosity and agglomeration of fibers, all welds had a strengthening effect from the fibers.

With a consumable electrode, the amount of fibers introduced to the weld is controlled primarily by the composition of the electrode. Where this composition differs substantially from the composition of the article being welded, the travel speed of the electrode can be adjusted to alter the composition of the weld. Alternatively, a consumable electrode may be used in conjunction with an injection tube to achieve the desired mixture of fibers and metal in the weld pool.

Sufficient fibers must be present in the weld pool to strengthen the weld, but the concentration of fibers must be controlled because the increase in viscosity of the molten pool makes the formation of a proper weld fillet difficult. We welded a 41 vol. % (v/o) magnesium - alumina metal matrix composite, where the alumina fibers have an aspect ratio of about 30:1. When the concentration of fibers in the molten pool is in the range of from about 12 to 20 volume percent (v/o), the resulting weld is strengthened and the viscosity of the molten pool is such that an effective weld can be formed.

For alumina fiber reinforced magnesium (ZE41A) composites having about 41 volume percent alumina fiber, the optimum weld composition contained about 15 volume percent alumina fiber. Above that, the weld pool became unduly viscous.

While the range of fiber concentrations has been determined for one particular system, such concentrations may or may not be applicable to other metal matrix composite systems. The key parameter that controls the maximum amount of fiber that can be introduced to the weld pool is the viscosity of the weld pool. While it would be desirable to have the weld strengthened to the same degree as the welded article, this strengthening may not be achievable if the viscosity of the weld pool at such fiber concentrations is excessive. It may be possible to decrease the viscosity somewhat by increasing the temperature of the molten pool or by adding matrix metal to the molten zone. Additional heating, however, may have adverse effects on the fibers or the composites being welded for each metal matrix composite system, one skilled in this art can devise welding parameters to practice the invention successfully without undue experimentation. For the alumina - magnesium system, we have found that the welding parameters are similar to those for welding conventional cast magnesium.

Reinforcing fibers other than alumina may be used. Silicon nitride is a particularly promising reinforcing fiber because of its stability at high temperature and high strength.

Additives to reduce agglomeration of the fibers might be used. With a consumable electrode, the additives can be mixed directly with the fibers and/or powdered metal. If desired, other metals or materials can be included in the mix to impart unique properties to the weld.

A weld pool of molten metal, substantially free of reinforcing fiber, should be established prior to introducing fibers with a weld rod. This pool can be formed by melting a portion of the composites or by melting a rod of matrix metal onto the weld line.

A weld pool substantially free of fiber was established, before the fiber-reinforced weld was initiated with a consumable weld rod. A gas-shielded tungsten arc was used in the welding process with argon gas shielding the molten pool. The pertinent welding parameters were:

Welded Article—0.5" FP/ZE41A cast magnesium composite
Polarity—AC imbalanced
Voltage—20–22 volts
Current—90–100 amps
Weld Rod—0.125" tubular magnesium with fiber filled core (17 v/o fiber)
Shielding Gas—Argon 30 ft$^3$/hour
Preheat and Welding Temperature—650° F.

The welded articles were initially heat treated at 625° F. for two hours, air cooled, treated at 350° F. for two hours, air cooled, and then aged at 350° F. for 16 hours.

Even for fiber fractions as low as 15 vol %, the weld pool had to be established initially without any added fibers. Once formed, the reinforced weld rod could be introduced into the weld pool and the weld could be extended along the entire weld line with the weld rods to add fibers to the pool.

Even with a 15 vol. % weld rod, the viscosity of the pool at times increased to a point where forming a good fillet was difficult. On these occasions, the weld showed a concentration of fibers greater than about 15 vol. %. The increased concentration probably occurred because of variations in concentrations of fibers in the weld rod. The viscosity problem could be overcome, when encountered, by adding metal to the pool. The resulting welds had fiber concentrations along the weld line varying from about 12–20 vol. % (v/o). The average fiber volume fraction was about 17 v/o. Welds formed in this way were stronger than unreinforced welds, thereby enhancing the properties of the welded article.

While preferred embodiments have been shown and described, those skilled in the art will recognize variations, modifications and alterations which might be made to the invention without departing from the inventive concept. Therefore, the invention should be construed broadly on view of this description to and the claims should be construed liberally to adequately protect the invention. The described embodiments are provided to illustrate the invention, and are not intended to limit it, unless such limitation is necessary in view of the pertinent prior art.

I claim:

1. A welded article, comprising at least two fiber reinforced metal matrix composite pieces joined by a reinforced weld, the weld having between about 12–20 volume percent reinforcing fibers to strengthen the weld over that of an unreinforced matrix metal weld and the remainder being a matrix metal.

2. The article of claim 1 wherein the matrix metal of each piece and of the weld is the same metal, and wherein that metal is either magnesium or aluminum.

3. The article of claim 2 wherein the fibers are selected from the group consisting of alumina, boron, silicon carbide, or silicon nitride.

4. The article of claim 1 wherein the matrix metal of each piece and of the weld includes magnesium and wherein the fibers include alumina.

5. A welded article, comprising at least one fiber reinforced metal matrix composite joined to another article with a weld having a composition of matrix metal and between about 12–20 volume percent reinforcing fibers to strengthen the weld over that of unreinforced matrix metal welds.

6. The article of claim 5 wherein the matrix metal is magnesium or aluminum.

7. The article of claim 5 wherein the fibers are selected from the group consisting of alumina, boron, silicon carbide, or silicon nitride.

8. The article of claim 5 wherein the metal matrix composite contains magnesium reinforced with alumina fibers and wherein the weld contains magnesium reinforced with alumina fibers.

* * * * *